United States Patent [19]

Hashimoto et al.

[11] Patent Number: 5,220,108
[45] Date of Patent: Jun. 15, 1993

[54] AMORPHOUS ALLOY CATALYSTS FOR DECOMPOSITION OF FLONS

[75] Inventors: Koji Hashimoto, 2-25-5, Shogen, Izumi-ku Sendai-shi, Miyagi; Hiroki Habazaki, Sendai, both of Japan

[73] Assignees: Koji Hashimoto, Sendai; Yoshida Kogyo K.K., Tokyo, both of Japan

[21] Appl. No.: 869,629

[22] Filed: Apr. 16, 1992

Related U.S. Application Data

[62] Division of Ser. No. 662,286, Feb. 28, 1991.

[30] Foreign Application Priority Data

Feb. 28, 1990 [JP] Japan .................................. 2-45661

[51] Int. Cl.$^5$ .............................................. C01B 7/24
[52] U.S. Cl. ........................... 588/208; 423/DIG. 13;
423/466; 423/245.1; 423/240 R
[58] Field of Search ............... 423/240 R, 245.1, 466, 423/DIG. 13, DIG. 20; 588/208, 209

[56] References Cited

U.S. PATENT DOCUMENTS

| | | | |
|---|---|---|---|
| 4,151,262 | 4/1979 | Rasp et al. | 423/240 |
| 4,219,419 | 8/1980 | Sweeny | 210/59 |
| 4,382,865 | 5/1983 | Sweeny | 210/743 |
| 4,418,046 | 11/1983 | Izumo et al. | 423/245 |
| 4,770,949 | 9/1988 | Hashimoto et al. | 428/687 |
| 4,937,215 | 6/1990 | Murakawa et al. | 502/36 |

*Primary Examiner*—Gary P. Straub
*Assistant Examiner*—Timothy C. Vanoy
*Attorney, Agent, or Firm*—Flynn, Thiel, Boutell & Tanis

[57] ABSTRACT

Highly active amorphous alloy catalysts for use in decomposing of flons into hydrofluoric acid, hydrochloric acid and carbon dioxide by the reaction of flons with water, consist of at least one element selected from the group of Ni and Co, at least one element selected from the group of Nb, Ta, Ti and Zr, which are effective for the formation of the amorphous structure by coexisting with at least one element selected from the group of Ni and Co, and at least one element selected from the group of Ru, Rh, Pd, Ir and Pt, which are necessary for the high catalytic activity. The alloys are activated by immersion into hydrofluoric acids.

6 Claims, 1 Drawing Sheet

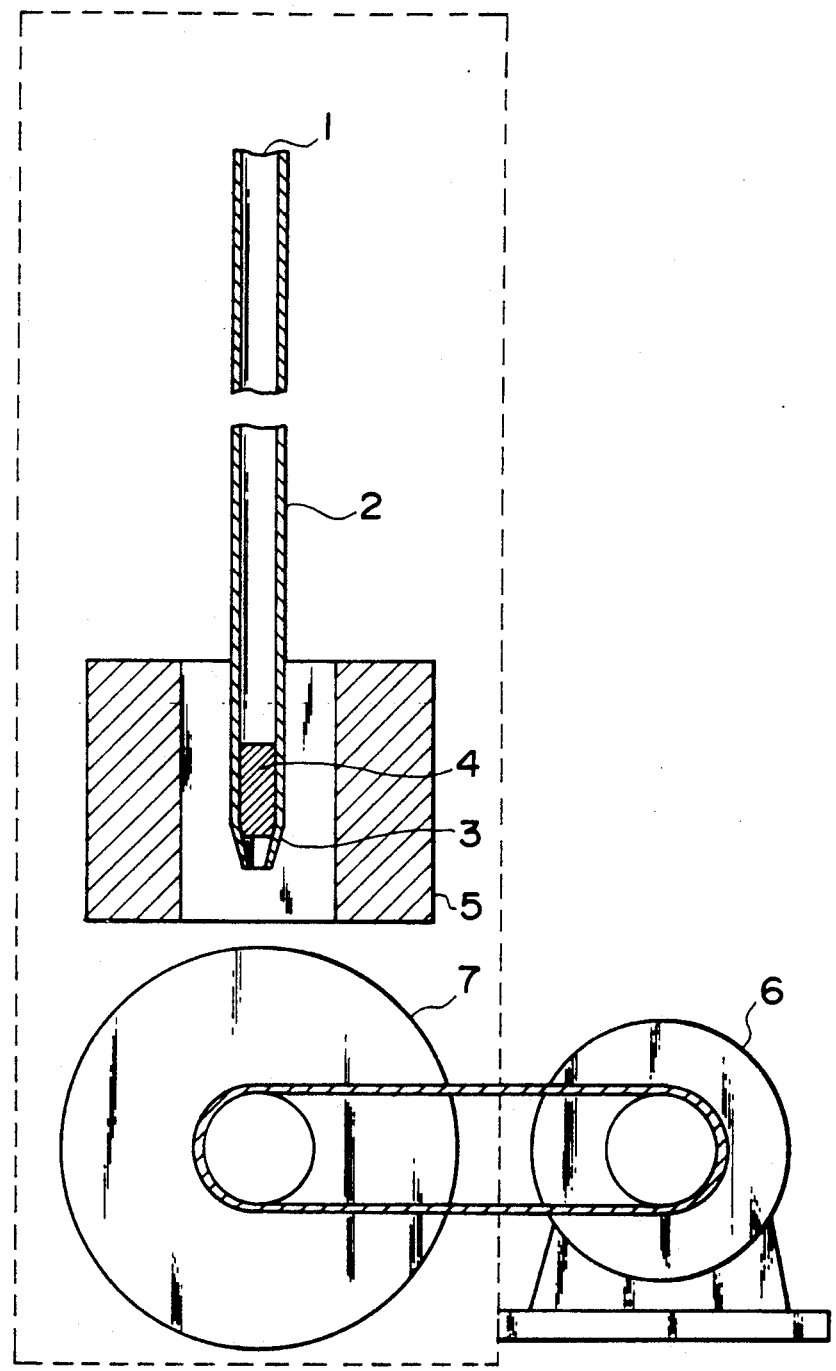

AMORPHOUS ALLOY CATALYSTS FOR DECOMPOSITION OF FLONS

This is a division of Ser. No. 07/662,286, filed Feb. 28, 1991.

BACKGROUND OF THE INVENTION

1. Field of the Invention

The present invention relates to materials which are particularly suitable as highly active catalysts for the decomposition of chlorofluorocarbons (flons) to hydrofluoric acid, hydrochloric acid and carbon dioxide, and are characterized by being easy to produce into catalysts and providing for easy recovery of its catalytically useful components.

2. Description of the Prior Art

Investigations into methods for the decomposition of flons had previously been unnecessary and hence were seldom performed. It has been known that they decompose by burning at high temperatures, such as 800° C., in an incinerator. According to recent investigations of the catalytic decomposition of flons on metal oxides, decomposition of flons occurred on zeolite at temperatures of from 300°–500° C.

In general, ordinary alloys are crystalline in their solid state. However, rapid quenching of some alloys having specific compositions in the liquid state gives rise to the solidification of an amorphous structure. These alloys are called amorphous alloys. The amorphous alloys are single phase alloys supersaturated with various elements and have significantly high mechanical strength in comparison with conventional industrial alloys. Some amorphous alloys with specific compositions have a variety of superior characteristics including extremely high corrosion resistance that cannot be obtained in ordinary crystalline alloys.

One of the present inventors applied the teachings of Japanese Patent Application No. 123111/85 regarding amorphous alloy electrode materials, which contain Ni, Ta and platinum group elements as essential components and are suitable as an anode for oxygen production by the electrolysis of acidic aqueous solutions because of their high activity for oxygen evolution.

Japanese Patent Application No. 123111/85 discloses:

(1) Amorphous alloy electrode materials which comprise 25 to 65 at % Ta, 0.3 to 45 at % of at least one element selected from the group of Ru, Rh, Pd, Ir and Pt, and more than 30 at % Ni.

(2) Amorphous alloy electrode materials which comprise 25 to 65 at % Ta and at least one element selected from the group of Ti, Zr and Nb, Ta being present in an amount of at least 20 at %, 0.3 to 45 of at least one element selected from the group of Ru, Rh, Pd, Ir and Pt, and more than 30 at % Ni.

Three of the present inventors have further developed surface activated amorphous alloy electrode materials which are suitable for the electrolysis of aqueous solutions and consist of Ni, very small amounts of platinum group metals and at least one element selected from the group of Ti, Zr, Nb and Ta, and their activation methods in Japanese Patent Application Nos. 169764/85, 169765/85 and 169767/85. They further applied the teachings of Japanese Patent Application No. 169766/85 regarding surface-activated supersaturated solid solution alloy electrode materials for electrolysis of aqueous solutions and their activation methods.

Japanese Patent Application No. 169764/85 discloses:

(1) Surface-activated amorphous alloy electrode materials consisting of 25 to 65 at % of Nb, 0.01 to 10 at % of at least one element selected from the group of Ru, Rh, Pd, Ir and Pt, and the balance substantially being Ni, used for the electrolysis of aqueous solutions.

(2) Surface-activated amorphous alloy electrode materials consisting of 25 to 65 at % Nb and at least one element selected from the group of Ti, Zr and less than 20 at % of Ta, Nb being present in an amount of at least 10 at %, and 0.01 to 10 at % of at least one element selected from the group of Ru, Rh, Pd, Ir and Pt, and the balance substantially being Ni, used for the was applied for electrolysis of aqueous solutions.

(3) Surface-activated amorphous alloy electrode materials consisting of 25 to 65 at % of Nb, 0.01 to 10 at % of at least one element selected from the group consisting of Ru, Rh, Pd, Ir and Pt, less than 7 at % of P and the substantial balance of Ni, used for the electrolysis of aqueous solutions.

(4) Surface-activated amorphous alloy electrode materials consisting of 25 to 65 at % Nb and at least one element selected from the group consisting of Ti, Zr and less than 20 at % of Ta, Nb being present in an amount of at least 10 at %, and 0.01 to 10 at % least one element selected from the group of Ru, Rh, Pd, Ir and Pt, less than 7 at % of P and the balance substantially being Ni, used for the electrolysis of aqueous solutions.

(5) A method for activating amorphous alloys for electrodes characterized by the immersion of the above-mentioned amorphous alloy electrode materials into corrosive solutions for surface enrichment of platinum group elements as a result of preferential dissolution of Ni, Nb, Ta, Ti and Zr.

Japanese Patent Application No. 169765/85 discloses:

(1) Surface-activated amorphous alloy electrode materials consisting of 25 to 65 at % of Ta, 0.01 to 10 at % of at least one element selected from the group consisting of Ru, Rh, Pd, Ir and Pt, less than 7 at % of P and the balance substantially being 20 at % or more Ni, used for electrolysis of aqueous solutions.

(2) Surface-activated amorphous alloy electrode materials consisting of 25 to 65 at % Ta and at least one element selected from the group of Ti, Zr and Nb, Ta being present in an amount of at least 20 at %, 0.01 to 10 at % of at least one element selected from the group of Ru, Ph, Pd, Ir and Pt, less than 7 at % of P and the substantial balance being 20 at % or more Ni, used for the electrolysis of aqueous solutions.

(3) A method for activating amorphous alloys for electrodes characterized by the immersion of the above-mentioned amorphous alloy electrode materials into corrosive solutions for surface enrichment of platinum group elements as a result of preferential dissolution of Ni, Nb, Ta, Ti and Zr.

Japanese Patent Application No. 169767/85 discloses:

(1) Surface-activated amorphous alloy electrode materials consisting of 25 to 65 at % Ta and at least one element selected from the group of Ti and Zr, Ta being present in an amount of from 5 to less than 20 at %, and 0.01 to 10 at % of at least one element selected from the group of Ru, Rh, Pd, Ir and Pt, the substantial balance being Ni, used for the electrolysis of aqueous solutions.

(2) Surface-activated amorphous alloy electrode materials consisting of 25 to 65 at % Ta and at least one element selected from the group of Ti and Zr, Ta being present in an amount of from 5 to less than 20 at %, and 0.01 to 10 at % of at least one element selected from the group of Ru, Rh, Pd, Ir and Pt, less than 7 at % of P and the balance substantially being 20 at % or more Ni, used for the electrolysis of aqueous solutions.

(3) A method for activating amorphous alloys for electrodes characterized by immersing the above-mentioned amorphous alloy electrode materials into corrosive solutions for surface enrichment of platinum group elements as a result of the preferential dissolution of Ni, Ta, Ti and Zr.

Japanese Patent Application No. 169766/85 discloses:

(1) Surface-activated supersaturated solid solution alloy electrode materials consisting of 20 to less than 25 at % of at least one element selected from the group of Nb and Ta, 0.01 to 10 at % of at least one element selected from the group of Ru, Rh, Pd, Ir and Pt and the balance substantially being Ni, used for the electrolysis of aqueous solutions.

(2) Surface-activated supersaturated solid solution alloy electrode materials consisting of 20 to less than 25 at % of at least one element selected from the group of Nb and Ta, 0.01 to 10 at % of at least one element selected from the group of Ru, Rh, Pd, Ir and Pt, less than 7 at % of P and the substantial balance being Ni, used for the electrolysis of aqueous solutions.

(3) Surface-activated supersaturated solid solution alloy electrode materials consisting of 20 to less than 25 at % of at least one element selected from the group of Ti and Zr and 5 at % or more of at least one element selected from the group of Nb and Ta, 0.01 to 10 at % of at least one element selected from the group of Ru, Rh, Pd, Ir and Pt and the balance substantially being Ni, used for the electrolysis of aqueous solutions.

(4) Surface-activated supersaturated solid solution alloy electrode materials consisting of 20 to less than 25 at % of at least one element selected from the group of Ti and Zr and 5 at % or more of at least one element selected from the group of Nb and Ta, 0.01 to 10 at % of at least one element selected from the group of Ru, Rh, Pd, Ir and Pt, less than 7 at % of P and the balance substantially being Ni, used for the electrolysis of aqueous solutions.

(5) A method for activating supersaturated solid solution alloys for electrodes characterized by immersing the above-mentioned supersaturated solid solution alloy electrode materials into corrosive solutions for surface enrichment of platinum group elements as a result of the preferential dissolution of Ni, Nb, Ta, Ti and Zr.

Furthermore, the present inventors presented surface-activated amorphous alloys for methanol fuel cell in Japanese Patent Application No. 154570/86.

Japanese Patent Application No. 154570/86 discloses:

(1) Surface-activated amorphous alloys for methanol fuel cells, consisting of 20 to 80 at % of at least one element selected from the group of Ti and Zr, 0.5 to 20 at % of Pt and the balance substantially being 10 at % or more of at least one element selected from the group of Ni and Co.

(2) Surface-activated amorphous alloys for methanol fuel cells consisting of 20 to 80 at % of at least one element selected from the group of Ti and Zr, 0.5 to 20 at % of Pt, at most 10 at % (at most the same at % as Pt if Pt is at most 10 at %) of at least one element selected from the group of Ru, Rh, Pd, Ir, Tl, Si, Ge, Sn, Pb and Bi and the balance substantially being 10 at % or more of at least one element selected from the group of Ni and Co.

(3) Surface-activated amorphous alloys for methanol fuel cells, consisting of 20 to 70 at % of at least one element selected from the group of Nb and Ta, 0.5 to 20 at % of Pt, and the balance substantially being at least one element selected from the group of Ni and Co.

(4) Surface-activated amorphous alloys for methanol fuel cells, consisting of 20 to 70 at % of at least one element selected from the group of Nb and Ta, 0.5 to 20 at % of Pt, at most 10 at % (at most the same at % as Pt if Pt is at most 10 at %) of at least one element selected from the group of Ru, Rh, Pd, Ir, Tl, Si, Ge, Sn, Pb and Bi, and the balance substantially being 10 at % or more of at least one element selected from the group of Ni and Co.

(5) Surface-activated amorphous alloys for methanol fuel cells consisting of 20 to 80 at % of at least one element selected from the group of Ti and Zr and at most 70 at % of at least one element selected from the group of Nb and Ta, 0.5 to 20 at % of Pt, and the balance substantially being 10 at % or more of at least one element selected from the group of Ni and Co.

(6) Surface-activated amorphous alloys for methanol fuel cell, consisting of 20 to 80 at % of at least one element selected from the group of Ti and Zr and at most 70 at % of at least one element selected from the group of Nb and Ta, 0.5 to 20 at % of Pt, at most 10 at % (at most the same at % as Pt if Pt is at most 10 at %) of at least one element selected from the group of Ru, Rh, Pd, Ir, Tl, Si, Ge, Sn, Pb and Bi, and the balance substantially being 10 at % or more of at least one element selected from the group of Ni and Co.

In order to overcome the high operation temperatures of catalysts consisting of platinum group elements supported on ceramics used in the purification of exhaust gases from plants and vehicles, in addition to the difficulty of recovering platinum group elements, three of the present inventors investigated catalysts capable of operating at low temperatures, such as the beginning of combustion, in addition to being easy to recover, and invented catalysts for the purification of exhaust gases by the reaction of carbon monoxide with nitrogen oxides in exhaust gases as Japanese Patent Application No. 262986/89.

The Japanese Patent Application No. 262986/89 discloses:

(1) Surface-activated catalysts for purifying exhaust gases, consisting of 20 to 70 at % of at least one element selected from the group of Nb and Ta, 0.5 to 20 at % of at least one element selected from the group of Ru, Rh, Pd, Ir and Pt, and the balance substantially being at least one element selected from the group of Ni and Co.

(2) Surface-activated catalysts for the purification of exhaust gases, consisting of 20 to 80 at % of at least one element selected from the group of Ti and Zr, 0.5 to 20 at % of at least one element selected from the group of Ru, Rh, Pd, Ir and Pt, and the balance substantially being at least 10 at % of at least one element selected from the group of Ni and Co.

(3) Surface-activated catalysts for the purification of exhaust gases, consisting of 20 to 80 at % of at least one element selected from the group of Ti and Zr and at most 70 at % of at least one element selected from the group of Nb and Ta, 0.5 to 20 at % of at least one element selected from the group of Ru, Rh, Pd, Ir and Pt and the balance substantially being at least 10 at % of at least one element selected from the group of Ni and Co.

Until the year 2000, the production and use of the 5 worst flons, which destruct ozonosphere and induce the greenhouse effect, will be prohibited. They may be substituted by other flons. Current industries are using large amounts of different flons. It is, therefore, necessary to develop a technique by which used flons can be converted to hydrofluoric acid, hydrochloric acid and carbon dioxide for re-use without consumption of a large amount of energy.

In view of the above discussion, there has been a strong demand for highly active and easily recoverable catalysts for converting flons at low temperatures and with a low consumption of energy.

SUMMARY OF THE INVENTION

It is an objective of the present invention to provide highly active and easily producible and recoverable catalysts by which the reaction of flons with water to form hydrofluoric acid, hydrochloric acid and carbon dioxide can be conducted at relatively low temperatures close to ambient temperatures.

The objective of the invention has been achieved by finding that some amorphous alloys have a high catalytic activity for the conversion of flons. The present invention is directed to catalytically active and easily producible and recoverable alloys consisting of at least one element selected from the group of Co and Ni, and valve metals which form an amorphous structure by being alloyed with at least one element selected from the group of Ni and Co, and a very small amount of platinum group elements, which are effective as the catalyst for the reaction of flons with water, the alloys being activated by hydrofluoric acid treatment.

BRIEF DESCRIPTION OF THE DRAWING

The single FIGURE shows an apparatus for preparing amorphous alloys of the present invention.

DETAILED DESCRIPTION OF THE PREFERRED EMBODIMENTS

In order to obtain easily producible and recoverable catalysts with a selectively high catalytic activity for a specific reaction, it is more convenient to use alloys containing necessary amounts of effective elements rather than using platinum group elements supported by alumina, titania, silica, etc. However, when conventionally processed crystalline alloys are used, the additions of large amounts of various elements often lead to the formation of multiple phases of different chemical properties and to poor mechanical strength, and it is difficult to obtain materials with a large specific surface area necessary for effective catalysts.

On the other hand, the amorphous alloys of the present invention are prepared to prevent localization of alloy constituents due to rapid quenching of the melt of the above-mentioned compositions and, hence, they are highly homogeneous and mechanically strong and tough. When these alloys are treated by immersion in hydrofluoric acids, alloy constituents not necessary for catalytic activity are dissolved into the hydrofluoric acids with the subsequent formation of highly active catalysts with a remarkable large surface area enriched in catalytically active platinum group elements. During this treatment, hydrogen evolution occurs violently on the platinum group elements in the alloys, since the platinum group elements act as the cathode in the amorphous alloys composed of a chemically homogeneous single phase solid solution. Since the hydrogen evolution provides dissolution of alloy constitutents not necessary for catalytic activity, violent hydrogen evolution on the homogeneous alloys results in the rapid and uniform dissolution of alloy constituents not necessary for the catalytic activity. This leads to the formation of highly active catalysts with a large surface area enriched in catalytically active platinum group elements.

Consequently, catalysts for production of hydrofluoric acid, hydrochloric acid and carbon dioxide by the reaction of flons with water can be obtained by the alloys of the present invention, after being subjected to activation treatment by immersion in hydrofluoric acids.

The components and compositions of the alloys of the present invention are specified as above for the following reasons:

In the alloys of the present invention, Ni and Co are the basic components which form the amorphous structure when they coexist with one or more elements selected from the group of Nb, Ta, Ti and Zr. Therefore, in order to form the amorphous structure, the alloys may consist of at least one element selected from the group of Ni and Co and at least one element selected from Nb and Ta should contain 20 to 70 at % of at least one element selected from the group of Nb and Ta. The amorphous structure can also be obtained when the alloys consist of at least one element selected from the group of Ni and Co and at least one element selected from Ti and Zr, with at least 20 to 80 at % of at least one of Ti and Zr being present.

Furthermore, in the alloys consisting of at least one element selected from the group of Ni and Co, at least one element selected from Ti and Zr, and at least one element selected from Nb and Ta, the amorphous structure can be obtained if the alloys contain 20 to 80 at % of at least one element selected from the group of Ti and Zr with at most, 70 at % of at least one of Nb and Ta being present.

The platinum group elements Ru, Rh, Pd, Ir and Pt are all effective for high catalytic activity and, hence, the catalytic activity requires that one or more of these platinum group elements should be present in an amount of 0.5 at % or more. However, the addition of large amounts of platinum group elements make the alloys quite expensive and are rather detrimental for both the increasing of the catalyst surface area and surface enrichment of the platinum group elements since the beneficial effect of preferential dissolution of elements not necessary for catalytic activity decreases by the excessive addition of platinum group elements. Therefore, the content of platinum group elements should not exceed 20 at %, and the most suitable contents are from 1 to 10 at %.

The preparation of the amorphous alloys of the present invention can be carried out by any kind of method for the preparation of amorphous alloys, such as rapid quenching from the liquid state.

One embodiment of an apparatus for preparing the amorphous alloys of the present invention is shown in the accompanying drawing. This is called the rotating wheel method. The apparatus is placed in a vacuum chamber indicated by a dotted rectangle. In the figure, a quartz tube 2 has a nozzle 3 at its lower end, and raw materials 4 and an inert gas for preventing oxidation of the raw materials are fed from an inlet 1. A heating furnace 5 is placed around the quartz tube 2 so as to heat the raw materials 4. A high speed wheel 7 is placed below the nozzle 3 and is rotated by a motor 6.

For the preparation of the amorphous alloys, the raw materials 4 of the prescribed compositions are placed in the quartz tube 2 and the vacuum chamber is evacuated up to about $10^{-5}$ torr. After the evacuated vacuum chamber is filled with argon gas of about 1 atm, the raw materials 4 are melted by the heating furnace 5. The molten alloy impinges under the pressure of the inert gas onto the outer surface of the wheel 7, which is rotated at a speed of 1,000 to 10,000 rpm, whereby an amorphous alloy is formed as a long thin plate, which may for example have a thickness of 0.01 mm, a width of 10 mm and a length of several meters.

The amorphous alloys of the present invention will be further illustrated by certain examples which are provided only for purpose of illustration and are not intended to limit the present invention.

EXAMPLE 1

A raw alloy was prepared by argon arc melting of a mixture of commercial metals so as to form Ni-40 at % Nb-2 at % Rh. After remelting of the raw alloy under an argon atmosphere, amorphous alloy ribbons were prepared by the rotating wheel method using the apparatus shown in the figure. The amorphous alloys thus prepared were 0.01-0.05 mm thick, 1-3 mm wide and 3-20 m long ribbons. The formation of an amorphous structure was confirmed by X-ray diffraction.

The highly active metallic catalyst was obtained by the surface activation treatment of this alloy by immersion in 46.5% HF for 300-900 sec at ambient temperature. The reactor tube was prepared by placing 0.5 g of the metallic catalysts of 5 cm length in a glass tube of 8 mm inner diameter into an electric furnace. The reactant gas mixture of CFC-12 flon and water obtained by bubbling CFC-12 flon through warm water was passed through the reactor tube. The amounts of $CO_2$ and remaining CFC-12 flon in the gas passing through the reactor tube were analyzed by gas chromatography. HF and HCl were dissolved in water and determined.

Table 1 shows the reaction temperature and conversion.

TABLE 1

| Reaction Temperature °C. | Mass of CFC-12 flon converted by 1 g of rhodium in the amorphous alloy catalyst for 1 h g |
|---|---|
| 250 | 1.2 |
| 300 | 2.6 |
| 350 | 12.5 |

EXAMPLE 2

Raw alloys, whose nominal compositions are shown in Table 2, were prepared by argon arc melting of mixtures of commercial metals. After remelting of the raw alloys under an argon atmosphere, amorphous alloys were prepared by the rotating wheel method by the apparatus shown in the figure. The amorphous alloys thus prepared were 0.01-0.05 mm thick, 1-3 mm wide and 3-20 m long ribbons. The formation of an amorphous structure was confirmed by X-ray diffraction.

The highly active metallic catalysts were obtained by the surface activation treatment of these alloys by immersing then in 2-46% HF solutions for 300-900 sec at ambient temperature. The reactor tube was prepared by placing 0.5 g of the metallic catalysts of 5 cm length in a glass tube of 8 mm inner diameter and into an electric furnace.

The reactant gas mixture of CFC-12 flon and water obtained by bubbling CFC-12 flon through warm water was passed through the reactor tube. The amounts of $CO_2$ and remaining CFC-12 flon in the gas passed through the reactor tube were analyzed by gas chromatography. HF and HCl were dissolved in water and determined.

Table 2 shows the reaction temperature and conversion.

TABLE 2

| Alloy (at %) | Mass of CFC-12 flon converted by 1 g of platinum group elements in the amorphous alloy catalysts for 1 h (g) Reaction Temperature | |
|---|---|---|
| | 150° C. | 200° C. |
| Ni—30Ta—2Rh | 1.0 | 8.0 |
| Ni—30Ta—2Pt | 0.2 | 2.2 |
| Ni—30Ta—2Ir | 0.5 | 2.0 |
| Ni—30Ta—2Pd | 0.3 | 1.8 |
| Ni—30Ta—2Ru | 0.2 | 2.0 |
| Ni—30Ta—3Rh | 1.0 | 3.1 |
| Ni—40Nb—2Rh | 1.1 | 3.2 |
| Ni—40Nb—2Ru | 0.3 | 2.0 |
| Ni—40Ta—30Nb—10Rh | 1.2 | 3.5 |
| Ni—10Ta—10Nb—0.5Rh | 1.0 | 2.9 |
| Ni—20Ta—20Nb—10Rh—10Ru | 1.2 | 3.5 |
| Ni—20Co—30Ta—10Nb—2Rh | 1.1 | 3.1 |
| Co—40Nb—3Rh | 1.1 | 3.1 |
| Ni—70Ti—0.5Ru | 0.2 | 2.0 |
| Ni—40Zr—0.25Rh—0.25Pt | 1.1 | 3.2 |
| Ni—20Zr—1Pt | 0.3 | 1.8 |
| Ni—40Ti—40Zr—3Ir | 0.3 | 1.9 |
| Co—20Zr—5Pd | 0.2 | 1.6 |
| Co—20Ti—20Pd | 0.3 | 1.9 |
| Ni—20Co—40Zr—1Pd-1Rh—1Ru-0.5Pt | 1.0 | 2.0 |
| Ni—70Ta—10Ti—1Pd | 0.2 | 1.9 |
| Ni—10Ta—30Nb—20Zr—1Pd | 0.2 | 1.9 |
| Ni—10Ta—10Nb—20Ti—20Zr—3Ru | 0.2 | 1.8 |
| Co—30Nb—10Zr—3Ir | 0.3 | 2.0 |
| Ni—30Co—10Ta—10Nb—10Ti—10Zr—0.25Ir—0.25Rh | 0.9 | 2.8 |

Consequently, the amorphous alloy catalysts of the present invention have very high activities for the decomposition of flons to hydrofluoric acid and carbon dioxide by the reaction of flons with water.

What is claimed is:

1. A method of decomposing chlorofluorocarbons comprising the step of reacting said chlorofluorocarbons with water at a temperature ranging from 150° C. to 350° C. in the presence of an activated alloy catalyst consisting of 20 to 70 atomic % of at least one metal selected from the group consisting of Nb and Ta, 0.5 to 20 atomic % of at least one metal selected from the group consisting of Ru, Rh, Pd, Ir and Pt, and the balance being at least one metal selected from the group consisting of Ni and Co, said catalyst being activated by immersion in hydrofluoric acid.

2. A method of decomposing chlorofluorocarbons comprising the step of reacting said chlorofluorocarbons with water at a temperature ranging from 150° C. to 350° C. in the presence of an activated alloy catalyst consisting of 20 to 80 atomic % of at least one metal selected from the group consisting of Ti and Zr, 0.5 to 20 atomic % of at least one metal selected from the group consisting of Ru, Rh, Pd, Ir and Pt, and the balance being at least one metal selected from the group consisting of Ni and Co, said catalyst being activated by immersion in hydrofluoric acid.

3. A method of decomposing chlorofluorocarbons comprising the step of reacting said chlorofluorocarbons with water at a temperature ranging form 150° C. to 350° C. in the presence of an activated alloy catalyst consisting of 20 to 80 atomic % in total of at least one metal selected from the group consisting of Ti and Zr and up to 70 atomic % of at least one metal selected from the group consisting of Nb and Ta, 0.5 to 20 atomic % of at least one metal selected from the group consisting of Ru, Rh, Pd, Ir and Pt and the balance being at least one metal selected from the group consisting of Ni and Co, said catalyst being activated by immersion in hydrofluoric acid.

4. The method of claim 3, wherein said alloy catalyst is $Ni_{68}Ta_{30}Rh_2$.

5. The method of claim 3, wherein said alloy catalyst is $Ni_{20}Ta_{40}Nb_{30}Rh_{10}$.

6. The method of claim 3, wherein said alloy catalyst is $Ni_{40}Ta_{20}Nb_{20}Rh_{10}Ru_{10}$.

* * * * *